United States Patent Office 3,211,703
Patented Oct. 12, 1965

3,211,703
POLYALIPHATIC POLYISOCYANURATE LAMINATING RESIN PREPARED IN THE PRESENCE OF A COCATALYST SYSTEM
Lucius G. Gilman, Wakefield, and Morton H. Gollis, Brookline, Mass., assignors to Monsanto Research Corporation, St. Louis, Mo., a corporation of Delaware
No Drawing. Filed Mar. 23, 1962, Ser. No. 182,110
11 Claims. (Cl. 260—77.5)

This invention relates to an aliphatic substituted polyisocyanurate and also to the method of producing the same, and more particularly pertains to a polyisocyanurate which possesses optical clarity thus rendering it especially suitable as a laminating resin for canopies and the like in high speed aircraft.

This application is a continuation-in-part of our copending application S.N. 845,657, filed October 12, 1959, now abandoned.

Under suitable reaction conditions aliphatic diisocyanates were made to polymerize into solid products. It was supposed that the products would be similar to those obtained from the aromatic diisocyanates but, quite unexpectedly, it was found that the aliphatic diisocyanates gave polymeric products having exceptional optical clarity. The aromatic diisocyanates in which an aliphatic group is intermediate of the aryl groups containing the isocyanate radicals can be made to polymerize into products having exceptional toughness and stability at elevated temperatures, but these products do not possess optical clarity. The mononuclear aromatic diisocyanates such as toluene diisocyanate are not suitable as starting materials for the production of laminating resins, because the resultant product is brittle and lacks stability at elevated temperatures. Therefore, among the diisocyanates, the ones found suitable for our specific purpose are the aliphatic diisocyanates.

Accordingly, an object of this invention is to provide a novel polymeric product having exceptional toughness, stability at elevated temperatures and optical clarity.

Another object of this invention is to provide a method for the production of a polymeric product having exceptional toughness, high temperature stability and optical clarity.

Still another object of this invention is to provide a canopy material for high speed aircraft having toughness, clarity and high temperature stability.

Other objects and advantages of this invention will become apparent from the following description and explanation thereof.

In accordance with the present invention, an aliphatic diisocyanate of the type contemplated hereunder is polymerized to a polyisocyanurate in the presence of a catalyst for ionic polymerization. The resultant polymer has the following repeating structural unit, which for the purpose of this specification and appended claims is designated as the trifunctional aliphatic substituted isocyanurate, viz.:

(I)
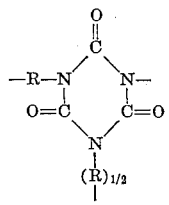

wherein R is a divalent aliphatic group such as a divalent acyclic or cycloaliphatic hydrocarbon group or a divalent hydrocarbon group substituted or interrupted by divalent S or O atoms bonded solely to carbon atoms. There will be at least ten of the repeating units shown in Formula I in the product.

The polymeric product of this invention is infusible and insoluble in organic or inorganic solvent. The lack of solubility and the infusible characteristic of the polymeric product mark it as one which is cross-linked, because linear polymers are fusible and soluble in either organic or inorganic solvents. Taking these properties with the fact that the monomeric starting material is difunctional and the isocyanate radicals are the only reactive groups, makes the existence of the above repeating cyclic structure genuine.

The polymeric product of this invention is prepared from an aliphatic diisocyanate having the following structural formula
(II)     OCN—R—NCO
wherein R is a divalent aliphatic group as defined in Formula I above.

Specific examples of monomers are 1,6-hexane diisocyanate; 1,4-butane diisocyanate; 1,4-diisocyanato-2-butene; β,β'-diisocyanatodiethylsulfide; ω,ω'-diisocyanato dipropylether; 1,5-diisocyanato-2,2-dimethylpentane; 1,6-diisocyanato-3-methoxyhexane; 1,4-bis(3-isocyanatopropoxy)butane; 1,4-bis(isocyanatoethyl) cyclohexane; 4,4'-dicyclohexylmethanediisocyanate; 2,2-bis-(4-isocyanatocyclohexyl)propane; bis(4-isocyanato-2-methylcyclohexyl)methane, etc.

The polymerization reaction is catalyzed by means of a catalyst which induces ionic polymerization including a strong base of an organic or inorganic type as long as it does not affect adversely to any significant extent the desired product materials. The strong bases include, for example, tertiary amines, e.g., triethylamine, pyridine, 1,4-diazabicyclo[2,2,2]octane, etc.; alkali or alkaline earth metal salts of low molecular weight carboxylic acids, such as those containing about 1 to 3 carbon atoms, e.g., sodium carbonate, sodium acetate, potassium acetate, etc.; alkali metal alkoxides, e.g., sodium methoxide, potassium propoxide, etc.; organic tertiary phosphines, e.g., triethylphosphine, dimethylphenyl phosphine, etc. Generally it is found that the use of the catalyst facilitates obtaining shorter reaction times and the production of significant yields of polymer. The quantity of catalyst employed for the reaction may vary over wide limits, but in general, about 0.1 mole percent to 50 mole percent, preferably about 0.1 mole percent to 10 mole percent of catalyst, based on monomer starting material, may be employed.

The catalysis of the polymerization reaction is also conducted in the presence of an organic epoxide. The organic epoxide is miscible with the diisocyanate monomer. The epoxide includes aromatic and aliphatic compounds such as, for example, epihalohydrins, e.g., epichlorohydrin, etc.; alkylene oxides, e.g., propylene oxide, styrene oxide, etc.; alkenyl oxides, e.g., butadiene oxide, etc.; glycidyl esters, e.g., ethyl glycidate, etc. The presence of the epoxy group is required in the compound which is miscible or soluble with the monomer. The amount of organic epoxide employed with the ionic polymerization catalyst may vary considerably, but in general up to 100 mole percent, preferably about 0.1 mole percent to 20 mole percent of organic epoxide, based on monomer starting material, may be used.

The polymerization reaction is conducted in liquid phase by either employing a temperature at which the materials are in that state, involving the same in bulk form or by the use of a suitable solvent. By either method the polymerization temperature may vary from about ambient level to about 125° C. with the upper limit being determined by the fact that adverse effects tend to become noticeable above the same. While the temperature of polymerization may vary with pressure, nevertheless it is contemplated employing atmospheric pressure for the temperature range given above. On the other hand, if desired, the reaction may be conducted at subatmospheric or superatmospheric pressure and in this case the temperature may be varied outside the range herein given. When the reactants are employed in bulk form, that is, without a solvent, it is preferred to conduct the polymerization at a temperature of about ambient level to 75° C. in contrast to a preferred temperature of about 50° to 125° C. when using a solvent. Optimum temperatures for polymerization are generally decreased as the amount of solvent is decreased and the conditions approach bulk polymerization. Using less solvent than monomer (on a weight basis) it has been found advantageous to use a temperature of about 50° C. until gelation, and subsequently raise the temperature to about 125° C. before discontinuing heating. The time required for the polymerization reaction to be substantially completed may vary considerably depending upon the type of monomer employed and whether or not a solvent is used. When the reaction is effected in bulk form it may take from about 1 hour to about 500 hours for substantial completion and be considerably longer when a solvent is used in the reaction. If desired, the reaction time may be shortened to suit the particular needs of a situation or for that matter lengthened, without departing from the scope of the present invention.

The solvent employed for the polymerization reaction can be any one or more of those commonly employed for the same purpose. To be effective, the solvent is one in which the monomer and lower molecular weight reaction products are miscible or soluble. Further, the catalyst is also soluble or miscible with the solvent. Specific examples of solvents which are useful for the present invention are dimethylformamide, dimethylsulfoxide, 1,2-dichloroethane, trichloroethylene, etc. The solvent is used in amounts to provide a medium in which at least the monomer can be dissolved and therefore it can vary over wide limits for the purpose of the present invention. Generally about 0.1 to 20 parts, preferably 5 to 10 parts by weight of solvent per part of monomer starting material are employed. Such quantities of solvent are merely illustrative of the range which can be used for the present invention.

The polyisocyanurate product of the present invention is an infusible solid which is insoluble in either organic or inorganic solvents. The polymer has excellent toughness and high temperature stability and in addition it possesses optical clarity which differentiates it from the polymers obtained from aromatic diisocyanates. These properties render the polymer of this invention especially useful as a laminating resin for sheets of solid glass or glass fabrics or as a reinforcement material for glass filament such as is wound spirally into a cylindrical shape. Another outstanding characteristic of the aliphatic diisocyanates is that they can be used as such in coating glass fabric due to their low viscosities and the wetted fabrics, after being placed in continuous relationship to one another, can be made to polymerize at atmospheric pressure to form the desired laminate. The diisocyanate readily wets the glass fabric thus eliminating a difficulty which exists in respect to other monomeric materials.

In order to provide a fuller understanding of the present invention reference will be had to specific examples which form a part of this specification.

*Example 1*

2.9 parts by weight of styrene oxide and 1 part by weight of triethylamine were added in turn to 28 parts by weight of 1,6-hexane diisocyanate in a sealed tube. After a 40-hour period at ambient temperature, the resultant solution became very viscous. The reaction mass was cured at 100° C. for a period of one hour. The reaction mass set to a transparent, light tan solid, which had optical clarity.

*Example 2*

11 parts by weight of styrene oxide and one part by weight of 1,4-diazobicyclo[2,2,2]octane were added in turn to 30 parts by weight of 1,6-hexane diisocyanate in a stoppered tube at ambient temperature. After the reaction mass was allowed to stand for 11 minutes at ambient temperature, it set up as a gel. The resultant product was transparent and had a light tan color.

*Example 3*

11 parts by weight of styrene oxide and one part by weight of 1,4-diazobicyclo[2,2,2]octane were added in turn to 30 parts by weight of 1,6-hexane diisocyanate in 100 parts by weight of N,N-dimethylformamide in a stoppered tube at ambient temperature. The reaction mass was allowed to stand at ambient temperature for a period of 21 hours. As a result the reaction mass set up as a gel, which was a transparent light tan solid.

*Example 4*

11 parts by weight of styrene oxide and one part by weight of 1,4-diazobicyclo[2,2,2]octane were added in turn to 30 parts by weight of 1,6-hexanediisocyanate in a stoppered tube at ambient temperature. The reaction mass was heated to a temperature of 75° C., and after a three-minute period, it set up as a gel which was a transparent light tan solid.

*Example 5*

11 parts by weight of styrene oxide and one part by weight of 1,4-diazobicyclo[2,2,2]octane were added in turn to 30 parts by weight of 1,6-hexanediisocyanate and 180 parts by weight of N,N-dimethylformamide in a stoppered tube at ambient temperature level. The reaction mass was heated to a temperature mass of 75° C. and held at that level for a period of one hour. At the end of the reaction period, the product set as a gel of a light tan color.

It was noted during the course of the experiments reported above that the presence of the solvent slowed down the reaction, and thus improved optical clarity. In some instances, the polymerization of the aliphatic diisocyanate was fairly vigorous, and so, if care were not taken, the product would have less optical clarity than in those cases where a solvent or diluent were employed.

Having thus provided a description of our invention along with specific examples thereof, it should be understood that the scope is defined by the appended claims.

We claim:

1. A cross-linked solid polymeric product consisting of at least 10 repeating structural units of the formula

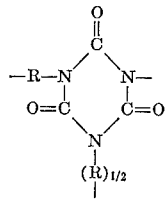

wherein R is a divalent aliphatic radical selected from the group consisting of divalent aliphatic hydrocarbon groups, divalent aliphatic hydrocarbon groups joined by divalent sulfur atoms, and divalent aliphatic hydrocarbon groups joined by divalent oxygen atoms.

2. A cross-linked solid polymeric product consisting of at least 10 repeating structural units of the formula

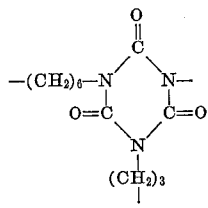

3. A method of providing a solid cross-linked polymer having toughness, high temperature stability and optical clarity which comprises polymerizing an aliphatic diisocyanate having the structural formula OCN—R—NCO wherein R is a divalent aliphatic radical selected from the group consisting of divalent aliphatic hydrocarbon groups, divalent aliphatic hydrocarbon groups joined by divalent sulfur atoms and divalent aliphatic hydrocarbon groups joined by divalent oxygen atoms with a basic catalyst of ionic polymerization and an organic epoxide until a polymer containing at least 10 isocyanurate ring units is produced.

4. The method of claim 3 wherein the diisocyanate is 1,6-hexane diisocyanate.

5. The process of claim 3 wherein the polymerization is conducted at a temperature of from about ambient level to about 125° C.

6. The process of claim 3 wherein the polymerization reaction is conducted in a solvent for the diisocyanate, said polymer being insoluble in said solvent.

7. A process which comprises polymerizing 1,6-hexane diisocyanate, with a basic catalyst of ionic polymerization and an organic epoxide at a temperature of from about ambient level to about 125° C. until a solid polymer containing at least 10 ring units and having toughness, thermal stability and optical clarity is obtained.

8. The process of claim 7 being further characterized such that the polymerization is conducted in a solvent selected from the group consisting of dimethylformamide, dimethylsulfoxide, 1,2-dichloroethane and trichloroethylene.

9. An article of manufacture comprising of a plurality of sheets of glass fabric bonded together by means of the polymer of claim 1.

10. A method of bonding sheets of glass fabric together which comprises coating the surface of said fabrics with an aliphatic diisocyanate having the structural formula OCN—R—NCO wherein R is a divalent aliphatic radical selected from the group consisting of divalent aliphatic hydrocarbon groups, divalent aliphatic hydrocarbon groups joined by divalent sulfur atoms and divalent hydrocarbon groups joined by divalent oxygen atoms, an ionic basic catalyst of polymerization and an organic epoxide, and placing the sheets of glass fabric in face-to-face contact and holding the same in said position until a solid polymer as defined in claim 1 is obtained, thereby bonding the sheets together.

11. The process of claim 10 wherein the diisocyanate is 1,6-hexane diisocyanate.

References Cited by the Examiner

UNITED STATES PATENTS

| 2,978,449 | 4/61 | France | 260—77.5 |
| 2,979,485 | 4/61 | Burhus | 260—77.5 |
| 3,075,979 | 2/63 | Tazuma | 260—77.5 |

OTHER REFERENCES

Angewandte Chemie: September 1947, pages 257–288.

LEON J. BERCOVITZ, *Primary Examiner.*

JOSEPH R. LIBERMAN, *Examiner.*